Patented Feb. 25, 1936

2,031,666

UNITED STATES PATENT OFFICE 2,031,666

PRODUCTION OF 5-HALOGEN-2-AMINO-
TOLUENES

Robert L. Perkins, East Aurora, N. Y., assignor
to National Aniline & Chemical Company, Inc.,
New York, N. Y., a corporation of New York No Drawing. Application October 25, 1933,
Serial No. 695,167

14 Claims. (Cl. 260—130.5)

This invention relates to the production of 5-halogen-2-aminotoluenes, and more particularly to a method of separating and recovering 5-halogen-2-aminotoluenes from crude 5-halogen-2-aminotoluenes containing other halogen-2-aminotoluenes. It relates especially to the separation and recovery of 5-chloro-2-aminotoluene in a purified condition from crude 5-chloro-2-aminotoluene containing 3-chloro-2-aminotoluene as an impurity.

The 5-halogen-2-aminotoluenes, and particularly 5-chloro-2-aminotoluene, are valuable intermediates for the manufacture of other chemical products. In accordance with the usual methods of manufacture, the said products are obtained not in the form of the pure compound but in the form of crude mixtures with other isomeric halogen aminotoluenes. Thus in accordance with one known process for the manufacture of 5-chloro-2-aminotoluene, 2-acetaminotoluene (o-acetotoluide) is chlorinated, the resulting 5-chloro-2-acetamino-toluene is then hydrolyzed (saponified) to produce 5-chloro-2-aminotoluene, and the 5-chloro-2-aminotoluene is recovered. The chlorination of 2-acetaminotoluene produces not only 5-chloro-2-acetamino-toluene but also more or less 3-chloro-2-acetamino-toluene in addition to other impurities and, under some conditions, a small amount of 3.5-dichlor-2-acetamino-toluene. The latter chloroacetamino-toluenes are also hydrolyzed when the 5-chloro-2-acetamino-toluene is hydrolyzed and they result in the corresponding chloro-aminotoluenes which are ordinarily recovered with the 5-chloro-2-aminotoluene and thereby render it impure. For the production of certain products, as for example dyestuffs, it is desirable that the 5-chloro-2-aminotoluene be comparatively free from other isomeric chloro-aminotoluenes and particularly from 3-chloro-2-aminotoluene.

An object of the present invention is to provide a simple and efficient process for producing 5-halogen-2-aminotoluene comparatively free from other halogen aminotoluenes.

A further object of the present invention is to provide a simple and efficient process for producing 5-chloro-2-aminotoluene comparatively free from other chloro-2-aminotoluenes, and especially for producing such a 5-chloro-2-aminotoluene from a crude 5-chloro-2-aminotoluene resulting from the chlorination of a 2-acylaminotoluene followed by hydrolysis of the chlorination product.

Other objects of the invention will in part be obvious and will in part appear hereinafter.

The present invention is based upon the discovery that sulfuric acid is a highly satisfactory and efficient reagent for the separation of 5-halogen-2-aminotoluenes from other halogen-2-aminotoluenes. Thus, I have found that sulfuric acid, as for example of a strength of about 2 to about 30 per cent., particularly of a strength of about 5 to about 15 per cent., and especially of about 10 per cent., provides an excellent medium for the separation of 5-chloro-2-aminotoluene from other chloro-2-aminotoluenes, and especially from 3-chloro-2-aminotoluene, particularly at temperatures below 20° C.

In order that the invention may be more fully comprehended, it will be hereinafter described in connection with the production of 5-chloro-2-aminotoluene from 2-acetotoluide. It will be understood, however, that the invention is not limited thereto, but may be employed in the production of other 5-halogen-2-aminotoluenes, as for example, 5-bromo-2-aminotoluenes; and, furthermore, that the 5-halogen-2-aminotoluenes may be produced in accordance with the present invention in a comparatively purified condition from crude 5-halogen-2-aminotoluenes, containing other halogen-2-aminotoluenes, produced in other ways.

In carrying out the said process, 2-acetaminotoluene is chlorinated, preferably while dissolved or suspended in an organic solvent or diluent, while maintaining conditions suitable for the formation of 5-chloro-2-acetamino-toluene; the resulting chlorinated 2-acetamino-toluene is then hydrolyzed, as for example by heating with an acid or with caustic alkali; and the mixture of chloro-2-aminotoluenes thus produced is separated from the hydrolysis reaction mixture, as by steam distillation. The chloro-2-aminotoluene mixture is dissolved in hot dilute sulfuric acid (as for example, sulfuric acid of a strength of about 5 per cent. to about 15 per cent. which is at a temperature of about 60° to about 100° C.) and when solution is complete, the solution is cooled to a temperature below 20° C., and preferably to about 0° to 5° C. As a result of the cooling, the sulfate of 5-chloro-2-aminotoluene crystallizes or precipitates out of solution. The precipitate of 5-chloro-2-aminotoluenesulfate is then mechanically separated from the mother liquor containing in solution the 3-chloro-2-aminotoluene and other impurities originally present therewith; as for example, by filtration. If desired, it may be further purified by crystallization from water to produce an exceptionally pure product. By dissolving the separated sulfate in water and making the solution alkaline, the sulfate of 5-chloro-2-aminotoluene is converted to the free base which separates as an oil. The oil is removed from the remaining aqueous solution and is dried. If desired, it may be further purified by distillation.

As an illustrative embodiment of a manner in which the invention may be practiced, the following example is presented. The parts are by weight.

Example

*Part 1.*—30 parts of o-acetotoluide (2-acetamino-toluene) are dissolved in 105 parts of glacial acetic acid, and to the well-stirred resulting solution there is added 42.5 parts of 20° Bé. hydrochloric acid. To the well-stirred solution, maintained at a temperature of 25° to 30° C., there is gradually added 12.9 parts of sodium chlorate previously dissolved in 58.7 parts of water. After the sodium chlorate solution has been added, the agitated mixture is held at a temperature of 30° C. for one hour. To the mixture, which may contain precipitated crystals of chlorinated 2-acetotoluide, there is added 390 parts of water and 70 parts of 48° Bé. sodium hydroxide solution, and the resulting mass is then stirred at room temperature for 6 to 8 hours, at the end of which time the mixture should show an alkaline reaction toward brilliant yellow test paper. If it is not alkaline, sufficient sodium hydroxide solution is added to make it so. The mixture is then cooled to 25° C. and the crystalline product, which comprises a mixture of chlorinated derivatives of 2-acetotoluide, is filtered off and saponified by boiling the same with excess of 48° Bé. sodium hydroxide solution (about 840 parts). The resulting mass is steam distilled at a temperature of about 115° C., water being added from time to time as required, until no more oil distills over. The oil is separated from the distillate in any suitable manner. It consists of crude 5-chloro-2-aminotoluene containing a considerable amount of 3-chloro-2-aminotoluene as an impurity together with, in some cases, a small amount of 3.5-dichloro-2-aminotoluene.

*Part 2.*—23.3 parts of crude 5-chloro-2-aminotoluene, such as that obtained in accordance with Part 1 above, are dissolved in hot (90° C.) sulfuric acid of 10 per cent. strength (a mixture of 142 parts of water and 16.9 parts of 66° Bé. sulfuric acid). When solution is complete, the solution is cooled to 0° C., the sulfate of 5-chloro-2-aminotoluene which separates is filtered off, and washed with a small amount of ice water. It is practically free from sulfates of 3-chloro-2-aminotoluene and 3.5-dichloro-2-aminotoluene. If a purer product is desired, it may be further purified by crystallization from water. The free base is obtained from the sulfate by dissolving the sulfate in water and adding alkali until the solution reacts alkaline. The base (5-chloro-2-aminotoluene) separates as an oil which may be collected and recovered in any suitable way; for example, it may be stratified, separated, dried and subsequently distilled to further purify it. A 5-chloro-2-aminotoluene can thus be obtained which melts at about 25° C. and boils at 246°–249° C. (corr.). The acetyl derivative melts at 143° C.

It will be realized by those skilled in the art that the invention is not limited to the details of the above example but that changes may be made in the materials and reagents employed, methods and order of procedure, and other conditions without departing from the scope of the appended patent claims.

Thus, the invention is not limited to the separation of 5-halogen-2-aminotoluene from the crude halogen-2-aminotoluene mixtures produced by halogenation of 2-acetamino-toluene, but may be applied to the recovery of 5-halogen-2-aminotoluenes from crude 5-halogen-2-aminotoluenes made by other processes. Furthermore, in the above example, other 2-acylamino-toluenes may be employed instead of the acetyl compound (as for example, the formic, oxalic, and other acid derivatives of 2-aminotoluene), and other halogenating agents may be employed instead of sodium chlorate and hydrochloric acid (as for example, chlorine, sulfuryl chloride, bromide, etc.). The temperature to which the sulfuric acid solution of the chloro-2-aminotoluene is cooled may also vary. In order to obtain maximum yields, however, the solution is preferably cooled to or below 0° C.

The purification by means of sulfuric acid may also be attained by extracting the crude 5-chloro-2-aminotoluene with sulfuric acid of 1 to 40 per cent. strength, whereby the isomeric halogen 2-aminotoluenes present as impurities are obtained as a solution in the sulfuric acid while the 5-halogen-2-aminotoluene remains as the insoluble or sparingly soluble sulfate, which sulfate may be separated from the solution of impurities and further treated, as described in the above example.

I claim:

1. A method of producing a purified 5-halogen-2-aminotoluene from a crude 5-halogen-2-aminotoluene which comprises separating the 5-halogen-2-aminotoluene in the form of a sulfate from a sulfuric acid solution of impurities.

2. A method of producing a purified 5-halogen-2-aminotoluene from a mixture including said 5-halogen-2-aminotoluene and an isomeric halogen-2-aminotoluene which comprises separating the 5-halogen-2-aminotoluene in the form of a sulfate from a sulfuric acid solution of the isomeric halogen-2-aminotoluene.

3. A method of producing a purified 5-halogen-2-aminotoluene from a crude 5-halogen-2-aminotoluene containing a 3-halogen-2-aminotoluene as an impurity which comprises separating the 5-halogen-2-aminotoluene in the form of a sulfate from a sulfuric acid solution of the 3-halogen-2-aminotoluene.

4. A method of producing a purified 5-chloro-2-aminotoluene from a mixture including 5-chloro-2-aminotoluene and an isomeric chloro-2-aminotoluene which comprises treating the mixture with sulfuric acid and separating the 5-chloro-2-aminotoluene in the form of a sulfate from the resulting sulfuric acid solution of the isomeric chloro-2-aminotoluene.

5. A method of producing a purified 5-chloro-2-aminotoluene from a crude 5-chloro-2-aminotoluene containing 3-chloro-2-aminotoluene as an impurity which comprises treating the crude 5-chloro-2-aminotoluene with sulfuric acid and separating 5-chloro-2-aminotoluene in the form of a sulfate from the resulting sulfuric acid solution of the 3-chloro-2-aminotoluene.

6. A method of producing a purified 5-chloro-2-aminotoluene from a crude 5-chloro-2-aminotoluene which comprises forming a solution of the crude 5-chloro-2-aminotoluene in sulfuric acid, and separating 5-chloro-2-aminotoluene sulfate therefrom while maintaining impurities in solution.

7. A method of producing a purified 5-chloro-2-aminotoluene from a crude 5-chloro-2-aminotoluene resulting from the chlorination of a 2- acylamino-toluene followed by hydrolysis of the resulting chlorinated 2-acylamino-toluene which comprises separating 5-chloro-2-aminotoluene sulfate from a solution of the accompanying impurities in sulfuric acid of about 1 per cent. to about 40 per cent. strength.

8. A method of producing a purified 5-chloro-2-aminotoluene from a crude 5-chloro-2-aminotoluene resulting from the chlorination of a 2-acylamino-toluene followed by hydrolysis of the resulting chlorinated 2-acylamino-toluene which comprises forming a solution of said crude 5-chloro-2-aminotoluene in sulfuric acid of a strength of about 2 to about 30 per cent. at a temperature of about 60° to about 100° C., cooling the resulting solution to precipitate 5-chloro-2-aminotoluene sulfate, and separating precipitated 5-chloro-2-aminotoluene sulfate from the remaining solution.

9. A method of producing a purified 5-chloro-2-aminotoluene from a crude 5-chloro-2-aminotoluene resulting from the chlorination of a 2-acylamino-toluene followed by hydrolysis of the resulting chlorinated 2-acylamino-toluene which comprises forming a solution of said crude 5-chloro-2-aminotoluene in sulfuric acid of a strength of about 5 to about 15 per cent. at a temperature of about 60° to about 100° C., cooling the resulting solution below 20° C. to precipitate 5-chloro-2-aminotoluene sulfate, and separating precipitated 5-chloro-2-aminotoluene sulfate from the remaining solution.

10. A method of producing a purified 5-chloro-2-aminotoluene from a crude 5-chloro-2-aminotoluene resulting from the chlorination of a 2-acylamino-toluene followed by hydrolysis of the resulting chlorinated 2-acylamino-toluene which comprises forming a solution of said crude 5-chloro-2-aminotoluene in sulfuric acid of about 10 per cent. strength at a temperature of about 90° C., cooling the solution to about 0° C. to precipitate 5-chloro-2-aminotoluene sulfate, and separating precipitated 5-chloro-2-aminotoluene sulfate from the remaining solution.

11. A method of producing a purified 5-chloro-2-aminotoluene from a crude 5-chloro-2-aminotoluene resulting from the chlorination of a 2-acylamino-toluene followed by hydrolysis of the resulting chlorinated 2-acylamino-toluene which comprises dissolving said crude 5-chloro-2-aminotoluene in hot sulfuric acid of about 10 per cent. strength, cooling the solution to about 0° C. to precipitate 5-chloro-2-aminotoluene sulfate, separating precipitated 5-chloro-2-aminotoluene sulfate from the remaining solution, converting the 5-chloro-2-aminotoluene sulfate to the free base, and separating the free base.

12. A method of producing a purified 5-chloro-2-aminotoluene from a crude 5-chloro-2-aminotoluene resulting from the chlorination of 2-acetotoluide with sodium chlorate and hydrochloric acid followed by hydrolysis of the resulting chlorinated 2-acetotoluide with aqueous caustic alkali which comprises dissolving said crude 5-chloro-2-aminotoluene in hot sulfuric acid of about 10 per cent. strength, cooling the solution to about 0° C. to precipitate 5-chloro-2-aminotoluene sulfate, separating precipitated 5-chloro-2-aminotoluene sulfate from the remaining solution, treating the 5-chloro-2-aminotoluene sulfate in water solution with an alkali to convert it to the free base, and separating the free base.

13. A method of producing a purified 5-halogen-2-aminotoluene from a 5-halogen-2-aminotoluene in a crude form resulting from the manufacture thereof, which comprises treating the crude 5-halogen-2-aminotoluene with sulfuric acid, and separating 5-halogen-2-aminotoluene in the form of a sulfate from the resulting sulfuric acid solution of impurities.

14. A method of producing a purified 5-chloro-2-aminotoluene from a crude 5-chloro-2-aminotoluene resulting from the chlorination of a 2-acylamino-toluene followed by hydrolysis of the resulting chlorinated 2-acylamino-toluene, which comprises treating the crude 5-chloro-2-aminotoluene with sulfuric acid of about 2 per cent. to about 30 per cent. strength, and separating the 5-chloro-2-aminotoluene in the form of a sulfate from the resulting sulfuric acid solution of impurities.

ROBERT L. PERKINS.